(No Model.) 2 Sheets—Sheet 2.
G. KUTZ.
INCUBATOR.
No. 599,145. Patented Feb. 15, 1898.
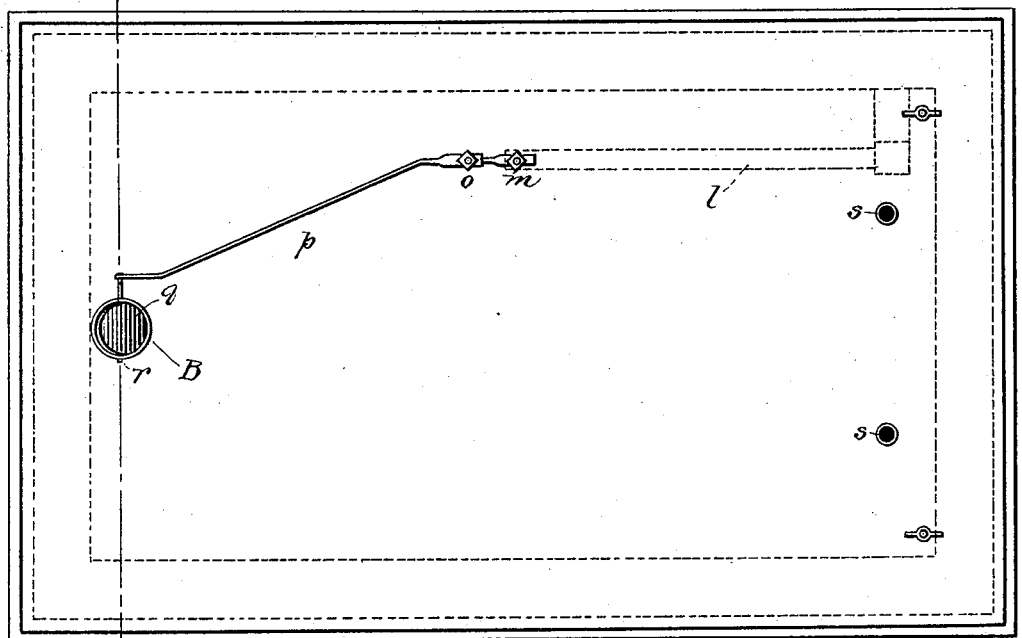
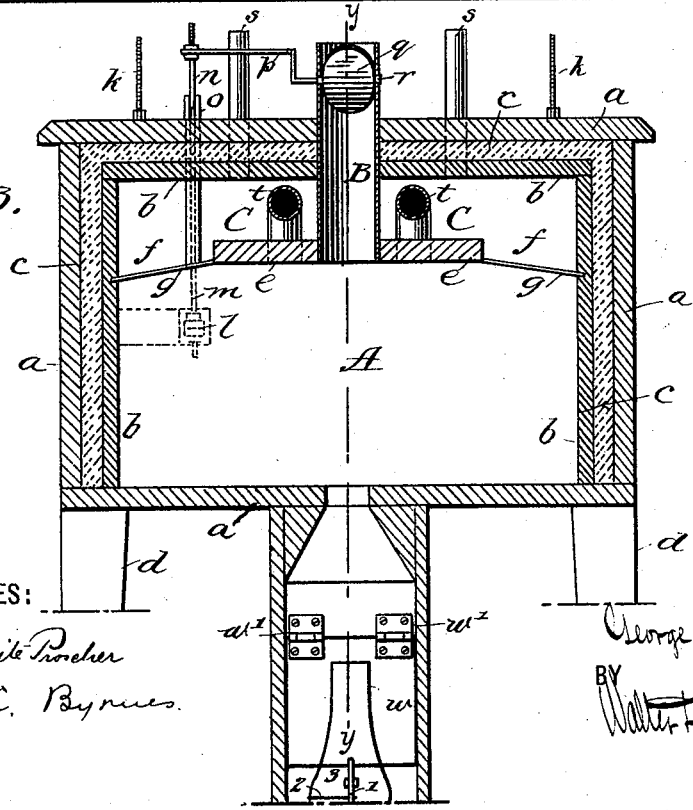
WITNESSES:
Francis White Procter
Thomas C. Byrnes
INVENTOR
George Kutz
BY
Walter S. Edmonds
ATTORNEY

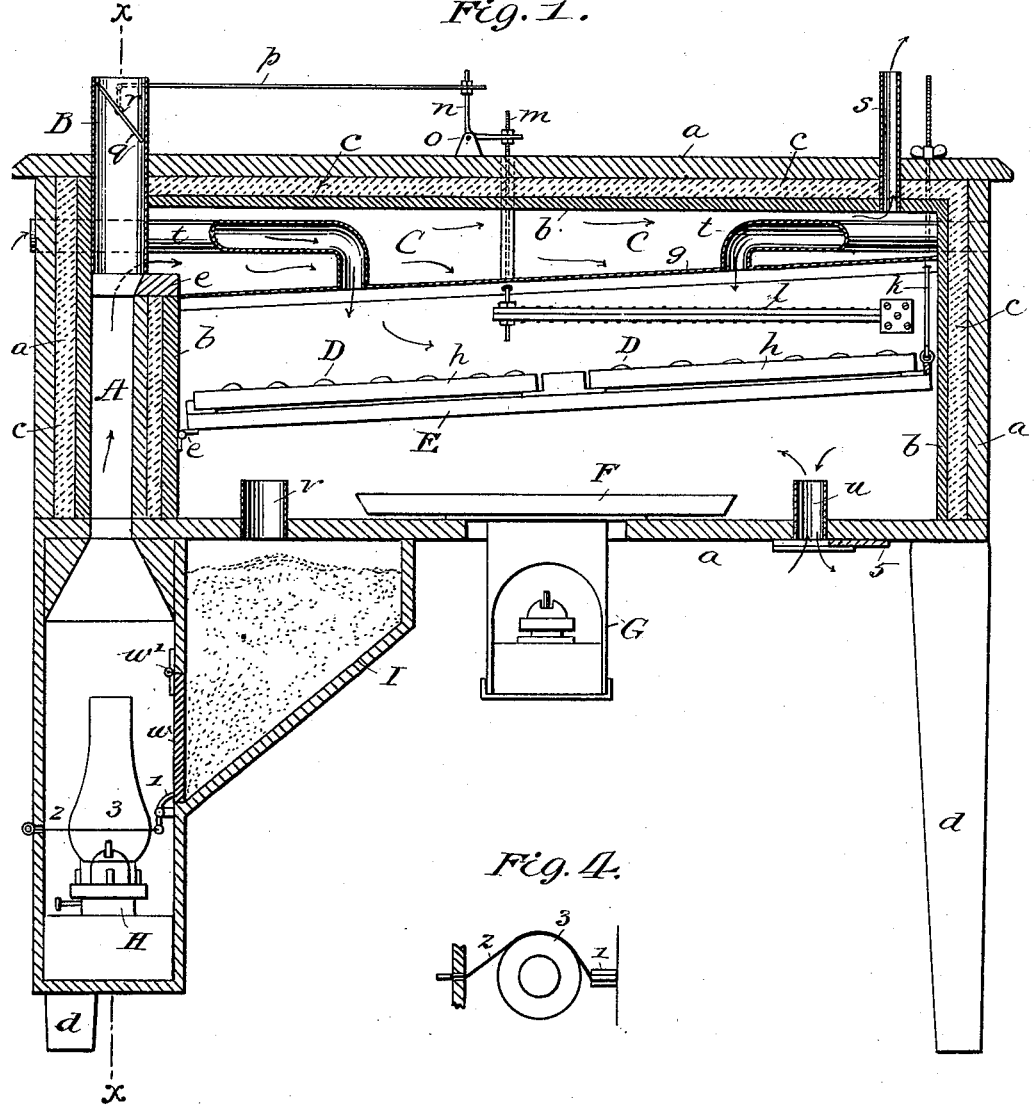

UNITED STATES PATENT OFFICE.

GEORGE KUTZ, OF EASTON, PENNSYLVANIA.

INCUBATOR.

SPECIFICATION forming part of Letters Patent No. 599,145, dated February 15, 1898.

Application filed December 20, 1895. Serial No. 572,757. (No model.)

*To all whom it may concern:*

Be it known that I, GEORGE KUTZ, a citizen of the United States, and a resident of Easton, in the State of Pennsylvania, have invented certain new and useful Improvements in Incubators, of which the following is a specification, reference being had to the accompanying drawings, in which—

Figure 1 is a vertical longitudinal central section of one of my incubators and its appliances, taken on the line $y\,y$ of Fig. 3. Fig. 2 is a top view of my incubator. Fig. 3 is a transverse vertical section of the incubator, taken on the line $x\,x$ of Figs. 1 and 2. Fig. 4 is a detail showing fastening of sand-box trap.

Similar letters and figures refer to similar parts.

The object of my invention is to provide an incubator for the purpose of hatching the eggs of fowls and the like, in which shall be better regulated and more uniformly preserved than heretofore the temperature and hygrometric conditions of the atmosphere surrounding the eggs and in which the danger from accidental conflagration will be diminished. I attain these objects by means of the devices which I will now describe.

$a\,a$ indicate the external walls of the incubator constructed of wood or any other material possessing the requisite strength and rigidity. The said walls completely inclose the incubator, with the exception of the orifices, which will be hereinafter described, and of an opening or door of any convenient shape and placed in any convenient situation in the incubator of such size as to enable the trays containing the eggs to be inserted and withdrawn conveniently and water supplied to the evaporating-pan and sand to the sand-box, as will be hereinafter described. I prefer to provide the said walls, or at least the side and top walls, with an inner lining $b$, between which and the outer shell $a$ I insert some material which is a good non-conductor of heat and cold, preferably compressed cork $c$. The incubator thus constructed is supported and elevated above the ground and out of contact with objects possessing disturbing temperature upon suitable legs $d$.

One end of the incubator-box I partition off from the remainder by a vertical wall A, which thus provides a flue or hot-air chamber extending transversely across a portion of one end of the incubator. I cover or inclose the central portion of the hot-air chamber or flue by a ceiling or roof $e$, through which passes the continuation of the direct draft-flue B from the lamp H. This leaves spaces open at the top of the hot-air chamber or flue on either side at $f\,f$, Fig. 3.

C C is the hot-air chamber proper separated from the egg-chamber $d\,d$ by the inclined partition $g$. This inclined partition or ceiling of egg-chamber extends completely across the incubator, so as to shut off the egg-chamber entirely from any direct connection with the hot-air chamber, and this inclined partition should be constructed out of some material possessing a high degree of conductivity as regards heat—as, for instance, preferably of galvanized sheet-iron.

E is the frame supporting the egg-trays $h\,h$. This frame is hinged at one end thereof, as shown at $e$, and is supported at the other end thereof by a rod $k$, which passes through the top of the incubator, having one of its ends screw-threaded and provided with a screw-nut, whereby, as will be readily understood, the angle of inclination of the frame E may be regulated and adjusted.

$l$ is a thermostat-bar composed in this instance of any two metals or other materials having different coefficients of expansion fixed at one of its extremities to the wall of the incubator and at the other secured to the rod $m$, which is in turn connected with the angle-lever $n$, pivoted at $o$, the other arm of which is connected by the rod $p$ with the damper $q$, rotating with the rod $r$.

$s$ is the normal exit flue or chimney for the contents of the hot-air chamber $c$.

$t\,t$ are ventilating-pipes connecting the exterior atmosphere with that of the egg-chamber D. $u$ is another ventilating-pipe connecting the lower portions of the egg-chamber D with the external atmosphere. The outer orifices of these last-mentioned ventilating-pipes are preferably provided with adjustable shutters, whereby their apertures may be regulated and adjusted, so as to correspondingly affect the supply of fresh air.

F is a pan to contain water for evaporation, as will be hereinafter described.

G is a lamp and its supports attached in any convenient manner to the floor of the incubator and in such relation to the pan F as to enable the contents of the latter to be heated thereby.

$v$ is an opening connecting the interior of the egg-chamber with the sand-box and intended merely to enable the sand to be conveniently introduced into the latter.

H is the lamp or other main source of heat from which it is intended to warm to the requisite temperature the air of the hot-air chamber C. The lamp H is, as shown in the drawings, contained in a completely-inclosed pit or lamp-chamber, which is, however, provided below the lamp with any suitable openings or orifices of such size as to admit sufficient air to be heated and passed into the air-chambers and otherwise through the incubator, as will be hereinafter described.

Sand-box I is provided with a vertical trap-door $w$, hinged at $w'$ and held closed by the pivoted finger 1, which is held in operative position by the string 2, bearing against the chimney 3.

The operation of my invention is as follows: The eggs are placed in trays $h$ in the usual manner and these inserted into their frame within the egg-chamber, which is then closed. The lamp H is lighted and heats the surrounding atmosphere, which rises through the vertical flue or preliminary chamber A and passes, as indicated by the arrow between $t$ and $e$ in Fig. 1, into the hot-air chamber C, and finally leaves the latter through the exit $s$. The heating of the air in the hot-air chamber tends to heat the air in the egg-chamber and thus secures to the eggs the high temperature required for incubation. The thermostat $l$ and its connections, as will be readily understood, tend to equalize to some extent at least the temperature in the hot-air and egg chambers, since, being set to a certain degree, it will on that being exceeded automatically open the damper $q$, thereby permitting a portion of the heated air to pass from the lamp directly through the continuation of the flue B and thus to the external air without adding to the temperature of the hot-air chamber C, and correspondingly on a reduction of the temperature in the chambers of the incubator, will automatically close the damper $q$, thus restoring the full flow of heated air to the hot-air chamber and raising the temperature again therein.

As is well understood, a supply of fresh air is requisite in order to insure the proper development of the embryo during the period of incubation, and this is secured by the fresh-air or ventilating pipes $t$ in a properly heated condition, since the latter are carried for a considerable distance through the hot-air chamber C, whereby their contents become correspondingly heated. Ventilation is still further secured by the aperture $u$, which serves as an exit for the foul air, which, as is well understood, usually falls to the lower part of the incubator, and through all these apertures $t\,t$ and $u$ not only is there ingress of air into the egg-chamber, but also egress, whereby a good ventilation is secured, and, as before stated, the extent of the aperture of these openings into the egg-chamber is regulated in any convenient way—by a shutter 5, for instance—capable of being adjusted conveniently from the exterior of the incubator, as may be required, according to the indications of the thermometers. The evaporating-tank F is supplied with water and during the earlier stages the evaporation induced by the heated air of the egg-chamber is usually sufficient. During the later stages of incubation, however, it is, as is now well understood, desirable to reduce the temperature of the egg-chamber and to increase the humidity in the atmosphere admitted to the eggs, which I effect in my apparatus by reducing the combustion in the main heating-lamp H and by instituting a supplemental and special combustion for the purpose of increasing the evaporation of the water by illuminating the lamp G.

A frequent source of danger in the use of incubators arises from the conflagration induced by explosion or undue combustion in the lamp H. I have provided means whereby all danger of this character may be automatically avoided. To this end I use the sand-box I, filled with sand or other equivalent and provided with a trap-door $w$, situated in such relation to the sand and to the lamp H and its inclosing chamber as to enable the sand on the opening of such trap to flow down upon and submerge, thereby extinguishing, the lamp. To obtain automatic action of this extinguisher, I secure the closing of the trap-door by any convenient catch or device, the normal position of which as a latch or closer of the door is secured by the stress of a combustible connection—as, for instance, a string 2, as illustrated in the drawings. This combustible connection is so adjusted relatively to the lamp—for instance, by causing the same to press against the chimney, as shown in Fig. 4—that an undue increase in the temperature of the latter will result in the burning and consequent severing of the connection. Thus, for instance, on the lamp-chimney becoming unduly heated or exploding the string 2 will promptly be burned through, the pivoted finger 1 released, the trap opened, and the sand precipitated upon the lamp, whereby all conflagration in that quarter will be automatically extinguished.

The orifices for admission of air into the lamp pit or chamber should be so shaped or provided with such guards externally in any convenient manner as to insure the retention of the sand within the said pit or lamp-chamber, and the result of the admission of the latter will be to fill the chamber and completely cover the lamp and cut off simultaneously the supply of air, whereby conflagration will be extinguished both by actual covering of the burning parts by the sand and likewise by the cutting off of the supply of oxygen.

It will be observed that the conducting-partition between the hot-air chamber and the egg-chamber g extends in a plane at an angle to the top of the hot-air chamber C. By this means I am enabled to secure throughout the hot-air chamber a more uniform temperature than would be possible were the floor or partition parallel to the top of the ceilings, and thus a more uniform temperature is correspondingly secured throughout the egg-chamber and over all the eggs, neither end of the egg-chamber being much hotter or colder than the other. By means of adapting the frame supporting the egg-trays so that the angle of inclination thereof may be adjusted and changed at will I am still further enabled to furnish to all the eggs a substantially uniform temperature. For instance, should it happen that under the peculiar local conditions in which my incubator is being operated a tendency is developed in the hot-air chamber to greater heat at one end than at the other—for instance, a somewhat higher temperature at the end nearest the lamp or source of heat, as compared with the temperature at the opposite or exit extremity, and this notwithstanding the equalization of such temperature produced, as aforesaid, by the inclination of the floor of the hot-air chamber—I am enabled by my adjustably-inclined egg-tray support to raise the eggs, so that those underlying the less warm end of the hot-air chamber may be approached thereto, whereby on properly adjusting the degree of inclination of the egg-trays it will prove substantially possible to furnish to each approximately the same amount of heat.

On hatching the birds will drop to the floor of the incubator in the usual way and remain there until removed, the orifices u and v being provided with raised walls to prevent them from falling through.

I am aware that sand has heretofore been suspended from the ceiling of rooms in such a way as to be released by heat and distributed through the air of said rooms and upon the bottom thereof or over burning liquids therein.

I am also aware that cords connected with the clapper-lever of alarm-bells have been carried through the lamp-chambers of incubators in such a way as to cause the said lever to be released and the gong to be sounded when said cord was severed by conflagration.

I am also aware that it is not novel to provide an incubator with an open water-tank in order to secure by evaporation increased humidity of the atmosphere within the incubator.

What I claim as new, and desire to secure by Letters Patent, is the following, viz:

1. In an incubator a hot-air chamber having an inclined bottom or partition between it and the egg-chamber and a hot-air entrance at or near its deeper extremity and an air-exit at or near its shallower extremity, substantially as and for the purposes described.

2. In an incubator an adjustably-inclined support for the eggs, substantially as and for the purposes described.

3. In an incubator, the incubating-lamp, having a frangible chimney and inclosed in a lamp-pit, opening at the top into a hot-air flue, communicating with the hot-air chamber of the incubator, in combination with an elevated sand-chamber containing sufficient loose sand to fill said pit and to completely cover said lamp and its flame, a door separating said chamber from said lamp-pit and said door's fastening maintained in tension by engagement with a cord held in tension by engagement with said chimney, substantially as and for the purposes described.

4. In an incubator, the combination of a hot-air chamber, C, a lamp, H, to heat said chamber, C, the flue, A, connecting said chamber, C, with a walled chamber containing said lamp, H, a sand-chamber, I, having a door, u, hinged at, w', a fastening, 1, held in normal position by a combustible cord, 2, whose tension is maintained by its engagement against the frangible chimney of said lamp, 3, all substantially as and for the purposes described.

5. In an incubator the combination of an inclined partition between the hot-air chamber and the egg-chamber and an adjustably-inclined support for the eggs, substantially as and for the purposes described.

6. An incubator having an egg-chamber provided with a wall composed of heat-conducting material, a heating device for applying heat to said wall, and an egg-supporting device arranged in the egg-chamber and provided with means for adjusting it toward and from said wall, substantially as set forth.

GEORGE KUTZ.

Witnesses:
JOEL W. THORNE,
JOHN S. NOBLE.